United States Patent
Chiang et al.

(10) Patent No.: US 7,757,350 B2
(45) Date of Patent: Jul. 20, 2010

(54) HINGE STRUCTURE WITH POSITION-LOCKING ENGAGEMENT MEANS

(75) Inventors: Chia Jung Chiang, Sinjhuang (TW); Huang Wen Lee, Sinjhuang (TW)

(73) Assignee: Jarllytec Co., Ltd., Taipei County (TW)

( * ) Notice: Subject to any disclaimer, the term of this patent is extended or adjusted under 35 U.S.C. 154(b) by 231 days.

(21) Appl. No.: 11/878,948

(22) Filed: Jul. 27, 2007

(65) Prior Publication Data

US 2008/0301908 A1 Dec. 11, 2008

(30) Foreign Application Priority Data

Jun. 11, 2007 (TW) .............................. 96120936 A

(51) Int. Cl.
*E05D 3/10* (2006.01)

(52) U.S. Cl. .............................. 16/367; 16/374; 16/375

(58) Field of Classification Search ................... 16/366, 16/367, 334, 328, 329, 330, 341, 374, 375, 16/376, 377; 455/575.3; 379/433.11, 433.12, 379/433.13; 361/679.06, 679.07, 679.11, 361/679.12, 679.15, 679.16, 679.2, 679.27, 361/679.28

See application file for complete search history.

(56) References Cited

U.S. PATENT DOCUMENTS

| | | | | |
|---|---|---|---|---|
| 6,125,507 | A * | 10/2000 | Katoh | 16/329 |
| 6,785,936 | B2 * | 9/2004 | Koshikawa | 16/328 |
| 6,990,711 | B2 * | 1/2006 | Koshikawa et al. | 16/334 |
| 7,146,195 | B2 * | 12/2006 | Sudo et al. | 455/575.1 |
| 7,251,859 | B2 * | 8/2007 | Oshima et al. | 16/330 |
| 2003/0056325 | A1 * | 3/2003 | Koshikawa et al. | 16/334 |
| 2003/0101538 | A1 * | 6/2003 | Koshikawa | 16/277 |
| 2006/0021195 | A1 * | 2/2006 | Yamada et al. | 16/367 |
| 2008/0034549 | A1 * | 2/2008 | Lee et al. | 16/367 |
| 2008/0109996 | A1 * | 5/2008 | Hsu et al. | 16/367 |

FOREIGN PATENT DOCUMENTS

TW M304879 1/2007

* cited by examiner

*Primary Examiner*—Victor Batson
*Assistant Examiner*—Jeffrey O'Brien
(74) *Attorney, Agent, or Firm*—Guice Patents PLLC

(57) ABSTRACT

A hinge structure with position-locking engagement means includes a bracket, which has on its side panel a pivot hole, a recessed positioning hole, and a first arched limiter groove adjacent to the recessed positioning hole and sloping in one direction, a pivot shaft inserted through the pivot hole of the side panel of the bracket and pivotally fastened to a support, a locating plate affixed to the pivot shaft, a ball rotatably mounted in a ball hole on the locating plate and selectively engageable into the recessed positioning hole and arched limiter groove of the side panel, a holding down spring plate affixed to the pivot shaft and having an actuation portion pressed on the ball to force the ball into the recessed positioning hole and first arched limiter groove of the side panel selectively, and spacer affixed to the pivot shaft and defining a gap between the holding down spring plate and the support for accommodating deformation of the actuation portion of the holding down spring plate when the bracket is biased relative to the pivot shaft.

8 Claims, 4 Drawing Sheets

HINGE STRUCTURE WITH POSITION-LOCKING ENGAGEMENT MEANS

BACKGROUND OF THE INVENTION

1. Field of the Invention

The present invention relates to hinges and more particularly, to a hinge structure with position-locking engagement means, which comprises a pivot shaft inserted through a bracket and a support, and engagement means provided between the bracket and the support for locking the bracket to the pivot shaft when the bracket is turned about the pivot shaft through a predetermined angle.

2. Description of the Related Art

A consumer electronic product with a lifting cover such as mobile computer, electronic dictionary, mobile video player, cell phone, etc., commonly uses a hinge to coupled the cover to the base member so that the cover can be opened from or closed on the base member. Therefore, the hinge determines the quality level of the product. A good hinge allows positive positioning, and does not cause noises during operation.

In recent years, advanced 3C electronic products have been continuously created. The conventional single hinge design to have the cover be turnable relative to the base member in a particular direction cannot satisfy the demand. Therefore, two pivot type hinge structures are developed for enabling the cover to be rotated relative to the base member when opened from the base member. Taiwan patent M304879 discloses a multiplex hinge issued to the present inventor, entitled "HINGE STRUCTURE". According to this design, the hinge structure comprises a bracket, which has a horizontal base panel and a vertical side panel, a first pivot set inserted through the side panel of the bracket and rotatably coupled to a support and having two elongated ribs protruded from one end of the pivot shaft and a guide groove defined between the elongated ribs, and a second pivot set inserted through the horizontal base panel of the bracket and rotatably coupled to a mounting frame and having a two flat cut faces at two sides of the head of the pivot shaft thereof for stopping against the elongated rids of the pivot shaft of the first pivot set such that the second pivot set is locked when the first pivot set is not turned to the predetermined angle, or unlocked for rotation when the first pivot set is turned to the predetermined angle. The first pivot set further comprises a supplementary plate member mounted on the pivot shaft of the first pivot set and having two raised portions corresponding to respective slots on the side panel of the bracket, and a limiter mounted on the pivot shaft of the first pivot set between the side panel of the bracket and the support. The raised portions of the supplementary plate member are respectively engaged into the slots of the side panel of the bracket when the first pivot set is rotated to the predetermined angle. The limiter has two protrusions spaced from each other at an angle and alternatively stoppable against a stop rod at the side panel of the bracket to limit the angle of rotation of the first pivot set relative to the bracket.

According to the aforesaid design, the through hole on the side panel of the bracket through which the pivot shaft of the first pivot set is inserted is spaced behind the center of the side panel at a distance about 1.2 mm, the raised portions of the supplementary plate member may be not all accurately engaged into the slots of the side panel of the bracket when the first pivot set is rotated to the predetermined angle. Therefore, an improvement is necessary.

SUMMARY OF THE INVENTION

The present invention has been accomplished under the circumstances in view. According to one aspect of the present invention, the hinge structure comprises a bracket and a first pivot set. The bracket comprises a horizontal base panel and a side panel perpendicularly downwardly extending from one end of said horizontal base panel. The side panel has a pivot hole, a recessed positioning hole, and a first arched limiter groove disposed adjacent to one side of the recessed positioning hole and sloping in one direction. The first pivot set comprises a pivot shaft, a locating plate, a holding down spring plate, and a spacer. The pivot shaft of the first pivot set is inserted in proper order through the pivot hole of the side panel of the bracket, the locating plate, the holding down spring plate and the spacer, and then pivotally fastened to a support. The locating plate has a ball hole corresponding to the recessed positioning hole of the side panel of the bracket, and a ball rotatably mounted in the ball hole and selectively engageable into the recessed positioning hole and first arched limiter groove of the side panel of said bracket. The holding down spring plate has an actuation portion pressed on the ball for forcing the ball into the recessed positioning hole and first arched limiter groove of the side panel of the bracket selectively. The spacer defines a gap between the holding down spring plate and the support. When the bracket is turned relative to the support, the recessed positioning hole and the first arched limiter groove are moved with the bracket relative to the ball, the actuation portion of the holding down spring plate is forced by the ball to deform, and the gap defined by the spacer between the holding down spring plate and the support accommodates deformation of the actuation portion of the holding down spring plate.

According to another aspect of the present invention, the hinge structure further comprises a second pivot set. The second pivot set comprises a pivot shaft rotatably inserted through the horizontal base panel of the bracket and rotatably coupled to a mounting frame.

According to still another aspect of the present invention, the hinge structure further comprises a third pivot set pivoted to the bracket. The third pivot set comprises a pivot shaft inserted through a pivot hole on a second side panel of the bracket and pivotally fastened to a through hole of a support.

According to still another aspect of the present invention, the side panel of the bracket further comprises a second arched limiter groove disposed adjacent to the recessed positioning hole opposite to the first arched limiter groove and sloping in one direction.

According to still another aspect of the present invention, the locating plate has at least one slot disposed adjacent to the actuation portion away from the ball.

According to still another aspect of the present invention, the pivot shaft of the third pivot set comprises a sector lug radially extending from one end thereof; the side panel of the bracket has a stop rod for stopping against one of the two opposite sides of the sector lug to limit the turning angle of the third pivot set relative to the bracket.

According to still another aspect of the present invention, the ball is positioned in the first arched limiter groove when the stop rod of the side panel of the bracket is stopped at one side of the sector lug, and positioned in the second arched limiter groove when the stop rod of the side panel of the bracket is stopped at the opposite side of the sector lug, thereby limiting the turning angle of the bracket relative to the first pivot set.

DETAILED DESCRIPTION OF THE PREFERRED EMBODIMENT

Figure 1:
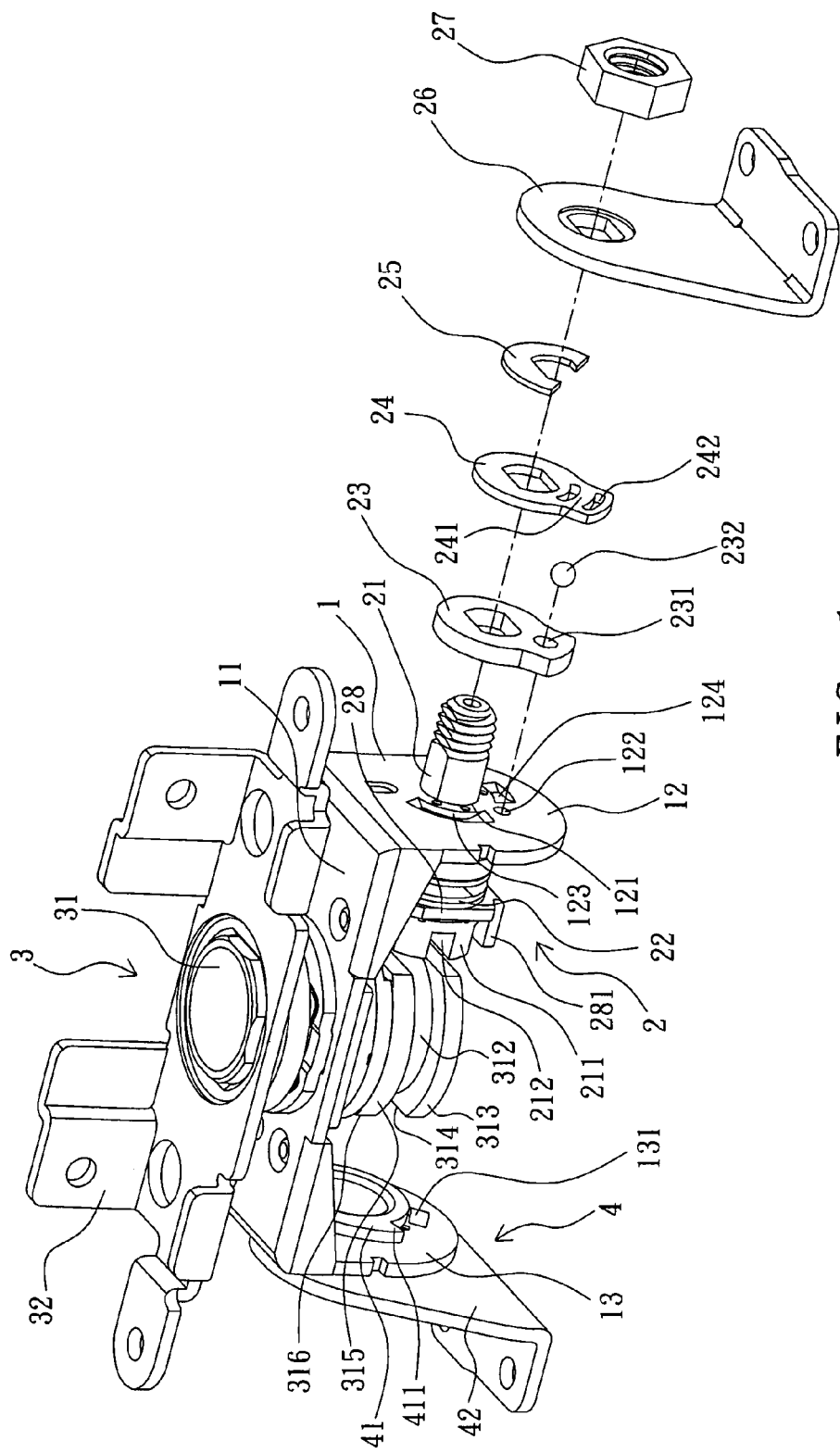
FIG. 1 is an exploded view of a hinge structure according to the present invention.

Referring to FIGS. 1~4, a hinge structure in accordance with the present invention is shown comprised of a bracket 1, a first pivot set 2, and a second pivot set 3. A third pivot set 4 may be provided and pivotally mounted in one end of the bracket 1 opposite to the first pivot set 2.

The bracket 1 is directly stamped out of a metal plate. According to this embodiment, the bracket 1 is a n shaped metal member having a horizontal base panel 11 and two vertical side panels 12 and 13 respectively downwardly extending from the two distal ends of the horizontal base panel 11 for supporting the first pivot set 2, the second pivot set 3 and the third pivot set 4. Alternatively, the bracket 1 can be a L-shaped metal member having only one side panel 12 perpendicularly downwardly extending from one end of the horizontal base panel 11 for supporting the first pivot set 2 and the second pivot set 3. The horizontal base panel 11 has an axle hole vertically extending through the top and bottom walls thereof for the passing of the hollow pivot shaft 31 of the second pivot set 3. The side panel 12 has a pivot hole 121 at a location subject to the client's requirement, for example, at an eccentric location for the passing of the pivot shaft 21 of the first pivot set 2, a recessed positioning hole 122 near the pivot hole 121 at one side, and two arched locating slots, namely, the arched start-end limiter groove 123 and the arched terminal-end limiter groove 124 respectively disposed at two opposite sides relative to the recessed positioning hole 122.

The arched start-end limiter groove 123 is paced from the recessed positioning hole 122 at 90-degrees and the arched terminal-end limiter groove 124 is paced from the recessed positioning hole 122 at 45-degrees, i.e., the bracket 1 can be turned relative to the first pivot set 2 within 135-degrees. According to this embodiment, the arched terminal-end limiter groove 124 is paced from the recessed positioning hole 122 at 45-degrees, however it is not a limitation and can be modified subject to the client's requirement. Further, the limiter grooves 123 and 124 each have a depth gradually increased in direction apart from the recessed positioning hole 122.

The first pivot set 2 is pivotally mounted in the side panel 12 of the bracket 1, comprising a pivot shaft 21 inserted in proper order through at least one, for example, a number of spring members 22, the pivot hole 121 of the side panel 12, a locating plate 23, a holding down spring plate 24, a spacer 25, and a support 26, and then fastened up with a fastening member 27, for example, a screw nut. The pivot shaft 21 is shaped like a bolt having two elongated ribs 211 protruded from its one end and a guide groove 212 defined between the two elongated ribs 211. Further, a supplementary contact member 28 is mounted on the pivot shaft 21 for rotation with the pivot shaft 21 to match the eccentrically positioned pivot hole 121 of the side panel 12. The supplementary contact member 28 is an angled plate member, having a contact lug 281, which extends in same extending direction as the elongated ribs 211 in a parallel manner relative to the elongated ribs 211. The locating plate 23, the holding down spring plate 24, and the spacer 25 are mounted on the pivot shaft 21 for rotation with the pivot shaft 21. The spring members 22 can be coil springs, corrugated spring plates, or spring washers.

The locating plate 23 has a ball hole 231 corresponding to the recessed positioning hole 122 of the side panel 12, and a ball 232 accommodated in the ball hole 231. The holding down spring plate 24 has an actuation portion 241 corresponding to the ball 232 and two slots 242 respectively disposed at the top and bottom sides of the actuation portion 241 for providing lateral elasticity relative to the ball 232. The spacer 25 works as a washer to keep a gap between the holding down spring plate 24 and the support 26 for deformation of the holding down spring plate 24.

Figure 2:
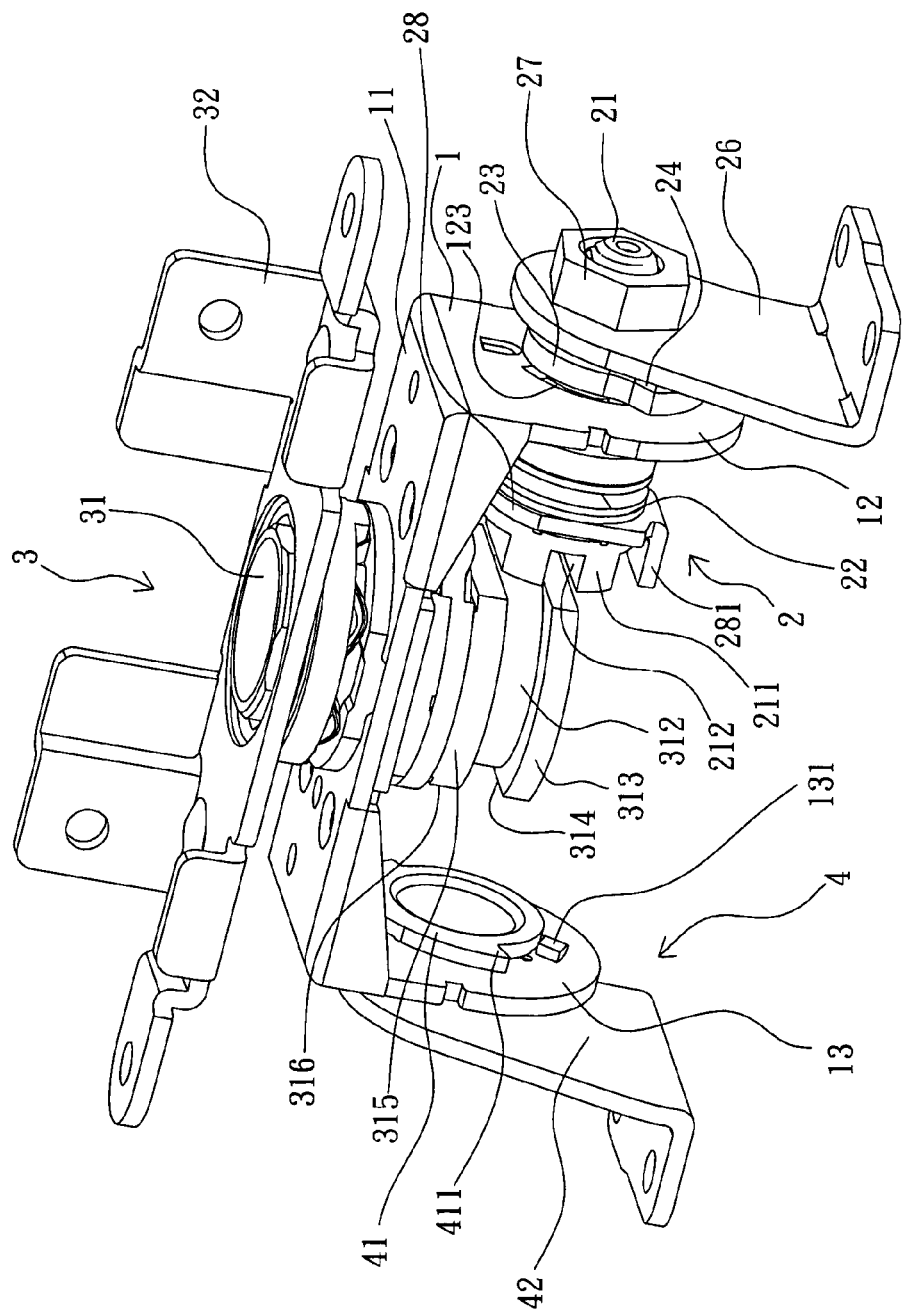
FIG. 2 is an elevational assembly view of the hinge structure according to the present invention.
Figure 3:
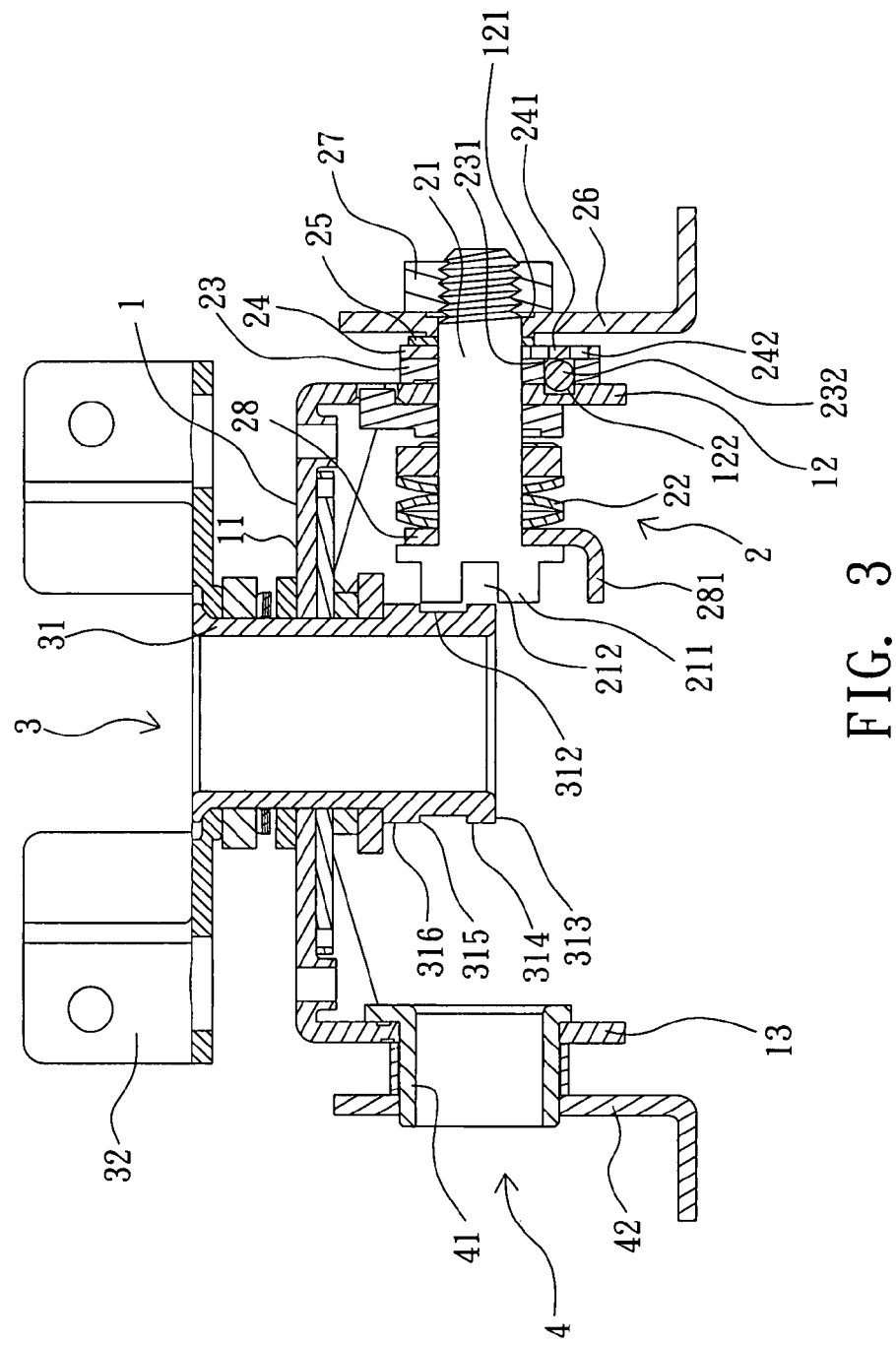
FIG. 3 is a sectional view of the present invention, showing the bracket turned to a specific angle and positioned.

Referring to FIG. 2, when not operated, the ball 232 is peripherally partially forced into the start-end limiter groove 123 by the lateral elasticity of the holding down spring plate 24. When the bracket 1 is rotatable by an external biasing force in clockwise direction, the side panel 12 is turned about the pivot shaft 21 of the first pivot set 2, and the arched start-end limiter groove 123 is moved relative to the ball 232. Because the arched start-end limiter groove 123 slopes in one direction, the ball 232 is moved gradually outwards to deform the actuation portion 241 of the holding down spring plate 24 in the gap provided by the spacer 25, preventing deformation of the support 26. When the recessed positioning hole 122 is moved with the side panel 12 relative to the pivot shaft 21 into alignment with the ball 232, the spring power of the actuation portion 241 of the holding down spring plate 24 immediately forces the ball 232 into the recessed positioning hole 122, thereby holding the side panel 12 in position (see FIG. 3). Thus, the user can positively sense that the bracket 1 has been turned to a specific angle relative to the first pivot set 2.

Figure 4:
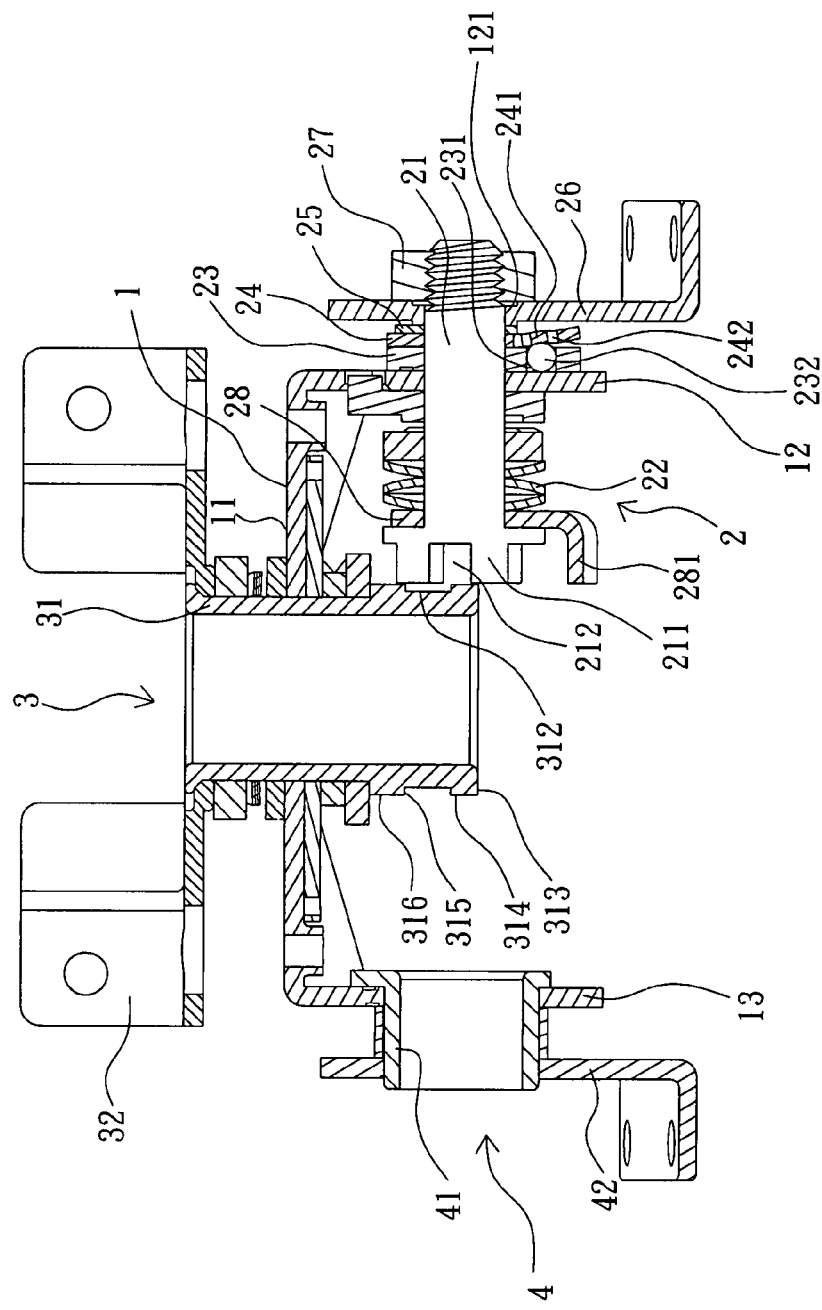
FIG. 4 is a sectional view of the present invention, showing the bracket turned to maximum open angle position.

Referring to FIG. 4, when continuously turn the bracket 1 about the pivot shaft 21 to move the recessed positioning hole 122 away from the ball 232, the ball 232 will touch the flat surface of the side panel 12 of the bracket 1 between the recessed positioning hole 122 and the arched end-point limiter groove 124 and forced by the flat surface of the side panel 12 to deform the actuation portion 241 of the holding down spring plate 24 till that the arched end-point limiter groove 124 receives the ball 232. At this time, the bracket 1 reaches the maximum open angle position, and the actuation portion 241 of the holding down spring 24 is closely attached to the flat surface of the side panel 12.

The hollow pivot shaft 31 of the second pivot set 3 is inserted vertically upwardly from the bottom side of the bracket 1 in proper order through at least one spring member, a locating member, the axle hole of the horizontal base panel 11 of the bracket 1, a stop member and a follower member, and then riveted to a mounting frame 32. Because this arrangement is same as the prior art design, no further detailed description in this regard is necessary. As illustrated, the hollow pivot shaft 31 has a head 313 at one end, a collar 315 extending around the periphery, and a neck 312 connected between the head 313 and the collar 315. The head 313 has two flat cut faces 314 for stopping the elongated ribs 211 of the pivot shaft 21 and the contact lug 281. The collar 315 has two flat cut faces 316 for stopping the elongated ribs 211 of the pivot shaft 21 and the contact lug 281.

The third pivot set 4 comprises a pivot shaft 41 inserted through the side panel 13 of the bracket 1 and then riveted to a L-shaped support 42, allowing rotation of the third pivot set 4 relative to the bracket 1. The pivot shaft 41 has a sector lug 411 radially extending from its one end. The side panel 13 has a stop rod 131 for stopping against one of the two opposite sides of the sector lug 411 to limit the turning angle of the third pivot set 4 relative to the bracket 1.

During application, the two support members 26 and 42 and the mounting frame 32 are respectively fixedly fastened to the base member and cover of an electronic device, for example, a mobile computer (not shown). When the electronic device is closed (0° angle), the two elongated ribs 211 are respectively stopped at the flat cut faces 314 and 316 of the head 313 and collar 315 of the hollow pivot shaft 31, prohibiting rotation of the second pivot set 3. When opening the cover of the electronic device, the mounting frame 32 and the bracket 1 are turned with the cover of the electronic device relative to the base member and the supports 26 and 42. During turning action of the bracket 1, the arched start-end limiter groove 123, the ball 232 of the locating plate 23, the actuation portion 241 of the holding down spring plate 24, and the spacer 25 are working relative to one another, and the gap defined by the spacer 25 receives deformation of the actuation portion 241 of the holding down spring plate 24. When the bracket 1 is turned relative to the supports 26 and 42 to a predetermined angle, for example, 90-degrees, the head 313 is received in the guide groove 212 between the two elongated ribs 211, i.e., the second pivot set 3 is unlocked and rotatable relative to the bracket 1. By means of the application of the present invention, the cover of the electronic device is openable relative to the base member in horizontal direction and rotatable in vertical direction when the cover is opened to a predetermined angle.

As indicated above, the invention allows turning of the first pivot set with the bracket in horizontal direction, and unlocks the second pivot set for allowing rotation of the bracket with the second pivot set when the bracket is turned with the first pivot set to a predetermined angle. Further, the invention uses only one ball in the ball hole of the locating plate between the side panel of the bracket and the actuation portion of the holding down spring plate to fit the recessed positioning hole and limiter grooves of the associating side panel of the bracket, ensuring positive positioning of the first pivot set relative to the bracket and preventing the drawback of the use of multiple balls for positioning that will cause excessive deformation of the adjacent contact member and the associating support.

A prototype of hinge structure has been constructed with the features of FIGS. 1~4. The hinge structure functions smoothly to provide all of the features disclosed earlier.

Although a particular embodiment of the invention has been described in detail for purposes of illustration, various modifications and enhancements may be made without departing from the spirit and scope of the invention. Accordingly, the invention is not to be limited except as by the appended claims.

What is claimed is:

1. A hinge structure with position-locking engagement means comprising:
    a bracket, said bracket having a horizontal base panel and a side panel perpendicularly downwardly extending from one end of said horizontal base panel, said side panel comprising a pivot hole, a recessed positioning hole, and a first arched limiter groove disposed adjacent to one side of said recessed positioning hole and sloping in one direction; and
    a first pivot set, said first pivot set comprising a pivot shaft, a locating plate, a holding down spring plate, and a spacer, the pivot shaft of said first pivot set being inserted in proper order through the pivot hole of said side panel of said bracket, said locating plate, said holding down spring plate and said spacer and then pivotally fastened to a support, said locating plate having a ball hole corresponding to the recessed positioning hole of said side panel of said bracket and a ball rotatably mounted in said ball hole and selectively engageable into the recessed positioning hole and the first arched limiter groove of said side panel of said bracket, said holding down spring plate having an actuation portion directly pressing said ball and forcing said ball in the recessed positioning hole and said first arched limiter groove of said side panel of said bracket selectively, said spacer defining a gap between said holding down spring plate and said support;
    wherein said side panel of said bracket and said holding down spring plate directly engages opposing surfaces of said locating plate and holds said ball in said ball hole of said locating plate;
    wherein when said bracket is turned relative to said support, said recessed positioning hole and said first arched limiter groove are moved with said bracket relative to said ball, and said actuation portion of said holding down spring plate is forced by said ball to deform and the gap defined by said spacer between said holding down spring plate and said support accommodates deformation of the actuation portion of said holding down spring plate.

2. The hinge structure with position-locking engagement means as claimed in claim 1, further comprising a second pivot set, said second pivot set comprising a pivot shaft vertically and rotatably inserted through the horizontal base panel of said bracket and rotatably coupled to a mounting frame.

3. The hinge structure with position-locking engagement means as claimed in claim 2, further comprising a third pivot set pivoted to said bracket, said third pivot set comprising a pivot shaft inserted through a pivot hole on a second side panel of said bracket and pivotally fastened to a through hole of a support.

4. The hinge structure with position-locking engagement means as claimed in claim 1, wherein said side panel of said bracket further comprises a second arched limiter groove disposed adjacent to said recessed positioning hole opposite to said first arched limiter groove and sloping in one direction.

5. The hinge structure with position-locking engagement means as claimed in claim 1, wherein said holding down spring plate has at least one slot disposed adjacent to said actuation portion and is spaced away from said ball.

6. The hinge structure with position-locking engagement means as claimed in claim 3, wherein the pivot shaft of said third pivot set comprises a sector lug radially extending from one end thereof; said side panel of said bracket has a stop rod for stopping against one of two opposite sides of said sector lug to limit the turning angle of said third pivot set relative to said bracket.

7. The hinge structure with position-locking engagement means as claimed in claim 1, wherein said ball is positioned in said first arched limiter groove when a stop rod of said side panel of said bracket is stopped at one side of a sector lug, and positioned in a second arched limiter groove of said side panel of said bracket when said stop rod of said side panel of said bracket is stopped at the opposite side of said sector lug, thereby limiting the turning angle of said bracket relative to said first pivot set.

8. The hinge structure with position-locking engagement means as claimed in claim 4, wherein said ball is positioned in said first arched limiter groove when a stop rod of said side panel of said bracket is stopped at one side of a sector lug, and positioned in said second arched limiter groove when said stop rod of said side panel of said bracket is stopped at the opposite side of said sector lug, thereby limiting the turning angle of said bracket relative to said first pivot set.

* * * * *